(12) United States Patent
Tsukagoshi

(10) Patent No.: US 9,030,526 B2
(45) Date of Patent: May 12, 2015

(54) TRANSMITTING APPARATUS, TRANSMITTING METHOD, RECEIVING APPARATUS, AND RECEIVING METHOD

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 823 days.

(21) Appl. No.: 13/377,237

(22) PCT Filed: Apr. 26, 2011

(86) PCT No.: PCT/JP2011/060196
§ 371 (c)(1),
(2), (4) Date: Dec. 9, 2011

(87) PCT Pub. No.: WO2011/136239
PCT Pub. Date: Nov. 3, 2011

(65) Prior Publication Data
US 2012/0081516 A1 Apr. 5, 2012

(30) Foreign Application Priority Data
Apr. 27, 2010 (JP) .................................. 2010-102347

(51) Int. Cl.
| | | |
|---|---|---|
| *H04N 13/00* | (2006.01) | |
| *H04N 21/236* | (2011.01) | |
| *H04N 21/2362* | (2011.01) | |
| *H04N 21/2368* | (2011.01) | |
| *H04N 21/43* | (2011.01) | *H04N 21/434* |
| (2011.01) | *H04N 21/81* | |
| (2011.01) | | |

(52) U.S. Cl.
CPC ....... *H04N 13/0029* (2013.01); *H04N 13/0059* (2013.01); *H04N 13/0062* (2013.01); *H04N 13/007* (2013.01); *H04N 21/236* (2013.01); *H04N 21/23614* (2013.01); *H04N 21/2362* (2013.01); *H04N 21/2368* (2013.01); *H04N 21/43* (2013.01); *H04N 21/4341* (2013.01); *H04N 21/4348* (2013.01); *H04N 21/8146* (2013.01); *H04N 21/816* (2013.01)

(58) Field of Classification Search
CPC .......... H04N 13/0029; H04N 13/0059; H04N 13/0062; H04N 13/007; H04N 21/236; H04N 21/23614; H04N 21/2362; H04N 21/2368; H04N 21/43; H04N 21/4341; H04N 21/4348; H04N 21/8146; H04N 21/816
USPC ...................................................... 348/42, 43
See application file for complete search history.

(56) References Cited

FOREIGN PATENT DOCUMENTS

| | | |
|---|---|---|
| JP | 1997-138384 | 5/1997 |
| JP | 2000-036969 A | 2/2000 |
| JP | 2002-218502 A | 8/2002 |
| JP | 2003-045343 A | 2/2003 |
| JP | 2004-274125 A | 9/2004 |
| JP | 2005-006114 A | 1/2005 |
| JP | 2005-094145 A | 4/2005 |

*Primary Examiner* — Allen Wong
(74) *Attorney, Agent, or Firm* — Lerner, David, Littenberg, Krumholz & Mentlik, LLP

(57) ABSTRACT

[Object] To allow the receiver side that receives a transport stream TS including a first video stream having two-dimensional image data inserted thereinto and a second video stream having the three-dimensional image data inserted thereinto in a time multiplexed manner to perform an appropriate and efficient process.
[Solution] First identification information and second identification information are inserted into the transport stream TS. The first identification information is identification information indicating whether a video stream included in the stream TS is the first video stream or the second video stream. The second identification information is identification information indicating whether the first identification information has been inserted or not. 3D signaling information including the first identification information is inserted into a user data area of one of a picture header and a sequence header. The second identification information is included in a video stream descriptor inserted and placed under a video elementary loop of a PMT.

18 Claims, 13 Drawing Sheets

FIG. 5

```
user_data() {
    user_data_start_code
    Stereo_Video_Format_Signaling_identifier                              32  (lsbf)
    while( nextbits() != '0000 0000 0000 0000 0000 0000 0000 0001' ) {    32  (lsbf)
        Stereo_Video_Format_Signaling()
    }
    next_start_code()
}
```

FIG. 6

| | No. of Bits | Identifier |
|---|---|---|
| Stereo_Video_Format_Signaling() { | | |
| Stereo_Video_Format_Signaling_Length | 8 | uimsbf |
| Reserved | 1 | "1" |
| Stereo_Video_Format_Signaling_type | 7 | bslbf |
| Reserved | 16 | "0x04FF" |
| } | | |

FIG. 7

Stereo_Video_Format_Signaling_identifier  (= "STVF")
 4 Byte unique identifier is assigned.
Stereo_Video_Format_Signaling_Length
 Byte count of Stereo_Video_Format_Signaling().
Stereo_Video_Format_Signaling_type
 See below.

Stereo_Video_Format_Signaling_type    Description
  0000011                              Side by Side 3D Video
  0000100                              Top & Bottom 3D Video
  0001000                              2D Video
  Other value                          Reserved

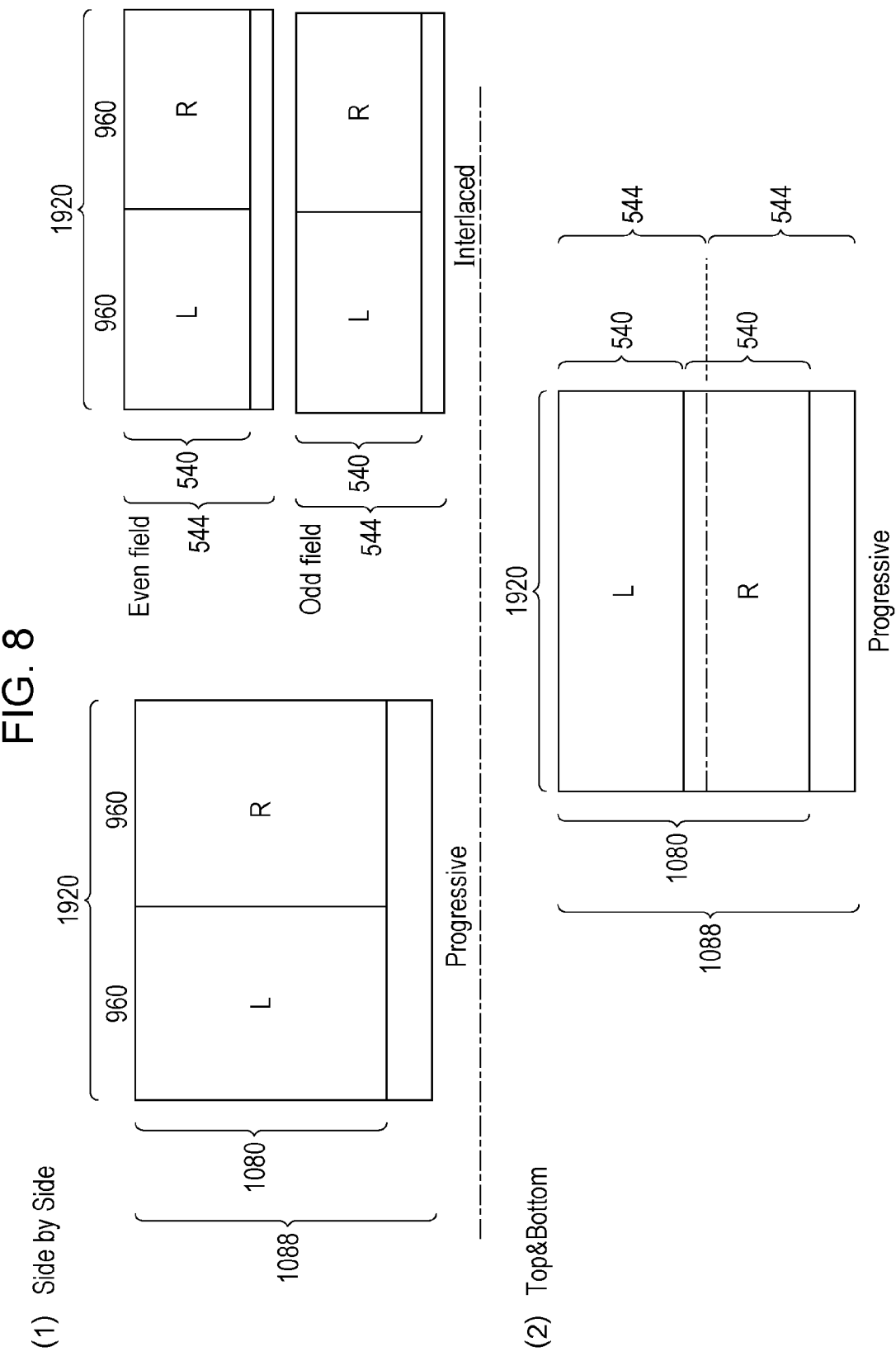

FIG. 9

```
video_stream_descriptor(){
    descriptor_tag                              8    uimsbf
    descriptor_length                           8    uimsbf
    multiple_frame_rate_flag                    1    bslbf
    frame_rate_code                             4    uimsbf
    MPEG_1_only_flag                            1    bslbf
    constrained_parameter_flag                  1    bslbf
    still_picture_flag                          1    bslbf
    if (MPEG_1_only_flag = = '0'){
        profile_and_level_indication            8    uimsbf
        chroma_format                           2    uimsbf
        frame_rate_extension_flag               1    bslbf
        3DFormat_Signaling_existed              1    bslbf
        reserved                                4    bslbf
    }
}
```

TRANSMITTING APPARATUS, TRANSMITTING METHOD, RECEIVING APPARATUS, AND RECEIVING METHOD

CROSS-REFERENCE TO RELATED APPLICATION

The present application is a national phase entry under 35 U.S.C. §371 of International Application No. PCT/JP2011/060196 filed Apr. 26, 2011, published on Nov. 3, 2011 as WO 2011/136239 A1, which claims priority from Japanese Patent Application No. JP 2010-102347 filed in the Japanese Patent Office on Apr. 27, 2010.

TECHNICAL FIELD

The present invention relates to a transmitting apparatus, a transmitting method, a receiving apparatus, and a receiving method and, in particular, to, for example, a transmitting apparatus that transmits a transport stream including a video stream having two-dimensional image data inserted thereinto and a video stream having three-dimensional image data inserted thereinto in a time multiplexed manner.

BACKGROUND ART

A variety of systems that display a stereoscopic image are known. For example, as described in PTLs 1 to 3, a method in which the left eye image and the right eye image having parallax are alternately displayed on a display in predetermined periods and are viewed using shutter glasses including liquid crystal shutters that are driven in synchronization with the display images is known.

CITATION LIST

Patent Literature

PTL 1: Japanese Unexamined Patent Application Publication No. 9-138384
PTL 2: Japanese Unexamined Patent Application Publication No. 2000-36969
PTL 3: Japanese Unexamined Patent Application Publication No. 2003-45343

SUMMARY OF INVENTION

Technical Problem

When content, such as a television program, is transmitted from a broadcast station to a television receiver of a user, three-dimensional (3D) image data and two-dimensional (2D) image data may be switched and transmitted. For example, in some cases, a TV program is transmitted in the form of three-dimensional image data, and a CM (commercial message) is transmitted in the form of two-dimensional image data. In such a case, the broadcast station transmits a transport stream including a video stream having two-dimensional image data inserted thereinto and a video stream having three-dimensional image data inserted thereinto in a time multiplexed manner.

In this case, it is desirable that a television receiver of a user determine whether the video stream included in the transport stream is a stream having two-dimensional image data inserted therein or a stream having three-dimensional image data inserted therein. That is, if a television receiver can determine the type of transport stream, the television receiver can suitably process the received image data at all times.

It is an object of the present invention to allow a receiver side that receives a transport stream including a video stream having two-dimensional image data inserted thereinto and a video stream having three-dimensional image data inserted thereinto in a time multiplexed manner to appropriately and efficiently process the transport stream.

Solution to Problem

According to a concept of the present invention, a transmitting apparatus is provided. The transmitting apparatus includes a transmitting unit configured to transmit a container having a predetermined format and including a first video stream having two-dimensional image data inserted thereinto and a second video stream having three-dimensional image data inserted thereinto in a time multiplexed manner, a first identification information inserting unit configured to insert, into the container, first identification information used for identifying whether a video stream is the first video stream or the second video stream, and a second identification information inserting unit configured to insert, into the container, second identification information used for identifying whether the first identification information has been inserted into the container.

According to the invention, the transmitting unit transmits a container having a predetermined format and including the first video stream having two-dimensional (2D) image data inserted thereinto and the second video stream having three-dimensional (3D) image data inserted thereinto in a time multiplexed manner. Examples of the container include containers of a variety of formats, such as a transport stream (MPEG-2 TS) defined in a digital broadcast standard or MP4 employed in Internet delivery. Examples of the video stream include a video stream based on VC-1, MPEG4-visual, or another encoding method in addition to a video stream based on the MPEG2 video encoding method.

The first identification information inserting unit inserts into the container the first identification information indicating whether a video stream is the first video stream or the second video stream. Note that if the first identification information indicates that the second video stream having the three-dimensional image data inserted thereinto is included, the first identification information further includes the format information regarding the three-dimensional image data. In addition, the second identification information inserting unit inserts, into the container, the second identification information indicating whether the first identification information has been inserted.

According to the invention, for example, the first identification information inserting unit inserts the first identification information into a first layer of the container, and the second identification information inserting unit inserts the second identification information into a second layer that is higher than the first layer of the container. For example, the first layer is a layer of the video, and the second layer is a layer higher than the layer of the video.

At that time, for example, if the container is a transport stream, the first layer is one of a picture layer and a sequence layer, and the second layer is a transport layer. In such a case, the first identification information is inserted into a user data area of one of the picture layer and the sequence layer of the video stream. In addition, in this case, for example, the second identification information is inserted into a descriptor placed under a video elementary loop of a program map table included in the transport stream. Alternatively, for example, the second identification information is inserted into a descriptor placed under one of a service description table and an event information table included in the transport stream.

In this way, according to the invention, the first identification information is inserted into the container. The first identification information indicates whether a video stream included in the container is a video stream having two-dimensional image data inserted thereinto or a video stream having three-dimensional image data inserted thereinto. Accordingly, on the receiver side, it can be easily determined whether the received image data is two-dimensional image data or three-dimensional image data on the basis of the first identification information. Thus, even when the received image data is switched from two-dimensional image data to three-dimensional image data or vice versa in a time multiplexed manner, an appropriate process can be performed at all times.

In addition, according to the invention, second identification information used for identifying whether the first identification information has been inserted is inserted into the container. Therefore, on the receiver side, only when the second identification information indicates that the first identification information has been inserted, the first identification information can be acquired and the process performed on the received image data can be switched to an appropriate process on the basis of the first identification information. That is, if the second identification information indicates that the first identification information has not been inserted, the need for acquiring the first identification information and monitoring the information can be eliminated on the receiver side. Thus, an efficient process can be performed.

Furthermore, according to the invention, for example, the three-dimensional image data is formed from left eye image data and right eye image data. The transmitting apparatus further includes a parallax information output unit configured to output parallax information used for adding parallax to the same superimposition information that is superimposed on an image based on the left eye image data and an image based on the right eye image data. The transmitting unit further stores the parallax information output from the parallax information output unit in the container when the transmitting unit transmits the container including the second video stream.

In such a case, since the parallax information corresponding to the three-dimensional image data is transmitted together with the three-dimensional image data, the receiver side receives the data of superimposition information to be superimposed on each of the left eye image data and the right eye image data having the superimposed position adjusted on the basis of the parallax information. Therefore, when the superimposition information is displayed, the integrity of the perspective among the objects in the stereoscopic image can be maintained in an optimum state.

In addition, according to another concept of the present invention, a receiving apparatus is provided. The receiving apparatus includes a receiving unit configured to receive a container having a predetermined format and including a first video stream having two-dimensional image data inserted thereinto and a second video stream having three-dimensional image data inserted thereinto in a time multiplexed manner, first identification information used for identifying whether a video stream is the first video stream or the second video stream, and second identification information used for identifying whether the first identification information has been inserted, an image data acquiring unit configured to acquire image data from the container received by the receiving unit, a first identification information acquiring unit configured to acquire the second identification information from the container received by the receiving unit, a second identification information acquiring unit configured to acquire the first identification information from the container if the second identification information acquired by the first identification information acquiring unit indicates that the first identification information has been inserted, and an image data processing unit configured to selectively perform one of a two-dimensional image process and a three-dimensional image process on the image data acquired by the image data acquiring unit on the basis of the first identification information acquired by the second identification information acquiring unit.

According to the invention, the receiving unit receives a container having a predetermined format and including a first video stream having two-dimensional image data inserted thereinto and a second video stream having three-dimensional image data inserted thereinto in a time multiplexed manner. The container further includes first identification information used for identifying whether a video stream is the first video stream or the second video stream and second identification information used for identifying whether the first identification information has been inserted. Examples of the container include containers of a variety of formats, such as a transport stream (MPEG-2 TS) defined in a digital broadcast standard or MP4 employed in Internet delivery. Examples of the video stream include a video stream based on VC-1, MPEG4-visual, or another encoding method in addition to a video stream based on the MPEG2 video encoding method.

The image data acquiring unit acquires image data from the container received by the receiving unit. In such a case, if the container includes the first video stream, the acquired image data is two-dimensional image data. In contrast, if the container includes the second video stream, the acquired image data is three-dimensional image data.

The first identification information acquiring unit acquires the second identification information from the container received by the receiving unit. In addition, if the second identification information indicates that the first identification information has been inserted, the first identification information acquiring unit acquires the first identification information. Thereafter, the image data processing unit selectively performs one of a two-dimensional image process and a three-dimensional image process on the image data acquired by the image data acquiring unit on the basis of the first identification information.

As described above, the first identification information is identification information indicating whether a video stream included in the container is a first video stream or a second video stream. Accordingly, if the first identification information indicates the video stream is the first video stream, the image data processing unit performs the two-dimensional image process on the two-dimensional image data acquired by the image data acquiring unit. In contrast, if the first identification information indicates the video stream is the second video stream, the image data processing unit performs the three-dimensional image process on the three-dimensional image data acquired by the image data acquiring unit.

According to the invention, the first identification information used for identifying whether a video stream is the first video stream or the second video stream is acquired from the container in this manner. Thereafter, the image data processing unit selectively performs one of a two-dimensional image process and a three-dimensional image process on the received image data on the basis of the first information. Therefore, even when the received image data is switched from two-dimensional image data to three-dimensional image data or vice versa in a time multiplexed manner, an appropriate process can be performed at all times.

In addition, according to the invention, the second identification information used for identifying whether the first identification information has been inserted is acquired from the container. Only when the second identification information indicates that the first identification information has been inserted, the first identification information is acquired. The data processing unit performs an appropriate process on the received image data on the basis of the first identification information. That is, if the second identification information indicates that the first identification information has not been inserted, the need for the process of acquiring the first identification information and monitoring the information can be eliminated. Thus, an efficient process can be performed.

Furthermore, according to the invention, if, for example, the second identification information acquired by the first identification information acquiring unit indicates that the first identification information has not been inserted, the image data processing unit performs the two-dimensional image process on the image data received by the receiving unit.

Still furthermore, according to the invention, for example, the receiving apparatus further includes a superimposition information data output unit configured to output data of superimposition information and a data superimposing unit configured to superimpose the data of superimposition information output from the superimposition information output unit on the image data output from the image data processing unit. If the image data processing unit performs the three-dimensional image process and outputs left eye image data and right eye image data that constitute the three-dimensional image data, the data superimposing unit adjusts the position at which the data of superimposition information output from the superimposition information data output unit is superimposed on the basis of parallax information between a left eye image based on the left eye image data and a right eye image based on the right eye image data and superimposes the data of superimposition information having the adjusted superimposed position on each of the left eye image data and the right eye image data. If the image data processing unit performs the two-dimensional image process and outputs the two-dimensional image data, the data superimposing unit directly superimposes the data of superimposition information output from the superimposition information data output unit on the two-dimensional image data.

In such a case, the superimposed positions of the data of superimposition information to be superimposed on the left eye image data and the right eye image data that constitute the stereoscopic image have been adjusted on the basis of the parallax information. Therefore, when the superimposition information is displayed, the integrity of the perspective among the objects in the stereoscopic image can be maintained in an optimum state.

Yet still furthermore, according to the invention, for example, if the second video stream is included, the parallax information for adding parallax to the same superimposition information to be superimposed on the left eye image data and the right eye image data that constitute the three-dimensional image data has been inserted into the container. The receiving apparatus further includes a parallax information acquiring unit configured to acquire the parallax information from the container. If the image data processing unit performs the three-dimensional image process and outputs the left eye image data and the right eye image data that constitute the three-dimensional image data, the data superimposing unit adjusts the position at which the data of superimposition information output from the superimposition information data output unit is superimposed on the basis of the parallax information acquired by the parallax information acquiring unit and superimposes the data of superimposition information having the adjusted superimposed position on each of the left eye image data and the right eye image data. In such a case, on the receiver side, for example, it is not necessary to process the left eye image data and the right eye image data and acquire the parallax information. Thus, adjustment of the position at which the data of superimposition information is superimposed can be easily and appropriately performed.

Advantageous Effects of Invention

According to the present invention, first identification information indicating whether a first video stream having two-dimensional image data inserted thereinto or a second video stream having three-dimensional image data inserted thereinto is included in a container and second identification information indicating whether the first identification information has been inserted are inserted into the container. Therefore, an appropriate and efficient process can be performed on the receiver side on which the container is received.

BRIEF DESCRIPTION OF DRAWINGS

FIG. 5 illustrates an example of the structure (the syntax) of user data (userdata) including 3D signaling information (Stereo_Video_Format_Signaling( )).

FIG. 6 illustrates an example of the structure (the syntax) of the 3D signaling information (Stereo_Video_Format_Signaling( )).

FIG. 7 illustrates the 3D signaling information and data defining information (the semantics) of the user data including the 3D signaling information.

FIG. 8 illustrates particular examples of a technique for dividing a screen on the basis of Side by Side and Top & Bottom.

FIG. 9 illustrates an example of the structure (the syntax) of a video stream descriptor (Video_stream_descriptor).

DESCRIPTION OF EMBODIMENTS

Embodiments for realizing the invention (hereinafter referred to as "embodiments") are described below. Note that descriptions are made in the following order:
1. Embodiments
2. Modifications

1. Embodiments

[Image Transmitting/Receiving System]

Figure 1:
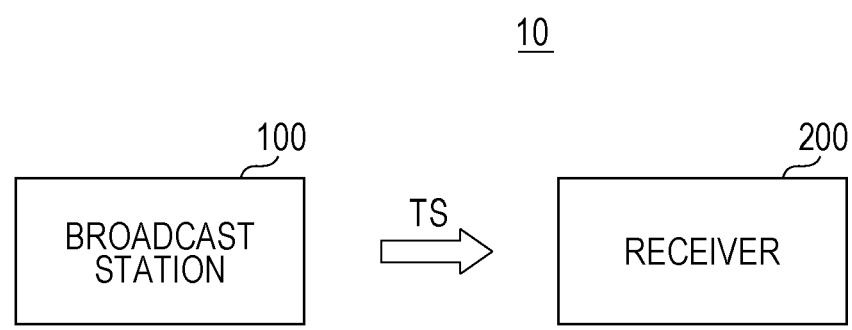
FIG. 1 is a block diagram illustrating an example of the configuration of an image transmitting/receiving system according to a first embodiment of the present invention.

FIG. 1 illustrates an example of the configuration of an image transmitting/receiving system 10 according to an embodiment. The image transmitting/receiving system 10 includes a broadcast station 100 and a receiver 200. The broadcast station 100 transmits a broadcast wave containing a transport stream (bit stream data) TS including a first video stream (an elementary stream) and a second video stream (an elementary stream) in a time multiplexed manner. At that time, the transport stream forms a container. The first video stream has two-dimensional (2D) image data inserted thereinto. In addition, the second video stream has three-dimensional (3D) image data inserted thereinto. Here, the video stream is an MPEG2 (Moving Picture Experts Group phase 2) video stream.

The transport stream TS includes first identification information and second identification information inserted thereinto. The first identification information is identification information indicating whether the video stream included in the transport stream TS is a first video stream or a second video stream. The second identification information is identification information indicating whether the first identification information has been inserted. In this case, the first identification information is inserted into a first layer of the transport stream TS, and the second identification information is inserted into a second layer of the transport stream TS.

The second layer is a layer that is higher than the first layer. For example, the first layer is a picture layer or a sequence layer, and the second layer is a transport layer. According to the present embodiment, the first identification information is inserted into the user data area of a picture header or a sequence header of the video stream. In addition, the second identification information is inserted so as to be located under a video elementary loop (Video ESloop) of a program map table (PMT) included in the transport stream TS.

The receiver 200 receives the transport stream TS by a broadcast wave transmitted from the broadcast station 100. The receiver 200 acquires image data from the received transport stream TS. In addition, the receiver 200 acquires the second identification information from the received transport stream TS. Furthermore, if the second identification information indicates that the first identification information has been inserted, the receiver 200 acquires the first identification information from the transport stream TS.

As described above, the first identification information is identification information indicating whether the video stream included in the transport stream TS is a first video stream or a second video stream. The receiver 200 selectively performs one of a two-dimensional image process and a three-dimensional image process on the received image data on the basis of the first identification information.

That is, if the first identification information indicates a first video stream, the receiver 200 performs a two-dimensional image process on the received image data (two-dimensional image data) and obtains two-dimensional image data. In contrast, if the first identification information indicates a second video stream, the receiver 200 performs a three-dimensional image process on the received image data (three-dimensional image data) and obtains the left eye image and the right eye image used for displaying a stereoscopic image.

Note that if the second identification information indicates that the first identification information has not been inserted, the receiver 200 does not perform a process of acquiring the first identification information from the transport stream TS. At that time, the receiver 200 performs a two-dimensional image process on the received image data (two-dimensional image data) and obtains two-dimensional image data.

[Example of Configuration of Transmission Data Generating Unit]

Figure 2:
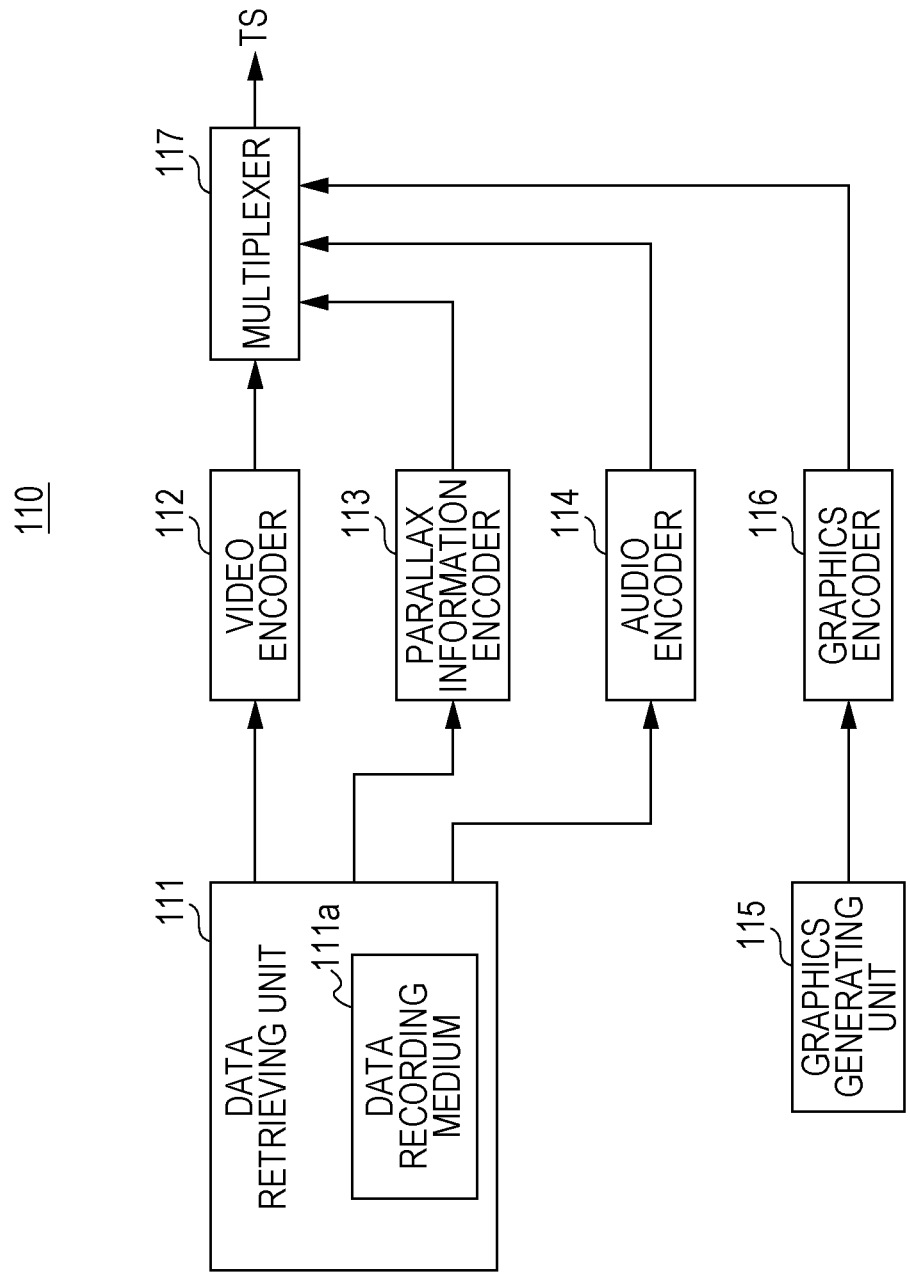
FIG. 2 is a block diagram illustrating an example of the configuration of a transmission data generating unit in a broadcast station of the image transmitting/receiving system.

FIG. 2 illustrates an example of the configuration of a transmission data generating unit 110 that generates the above-described transport stream TS in the broadcast station 100. The transmission data generating unit 110 includes a data retrieving unit (an archive unit) 111, a video encoder 112, a parallax information encoder 113, and an audio encoder 114. In addition, the transmission data generating unit 110 includes a graphics generating unit 115, a graphics encoder 116, and a multiplexer 117.

For example, the data retrieving unit 111 has a data recording medium 111a removably mounted therein. The data recording medium 111a stores the image data of a predetermined television program to be transmitted in the form of the transport stream TS and the audio data corresponding to the image data. For example, the image data is switched between three-dimensional (3D) image data and two-dimensional (2D) image data formed in accordance with the television program. In addition, for example, in the television program, the image data is switched between three-dimensional (3D) image data and two-dimensional (2D) image data formed in accordance with the main television program or a commercial message.

The three-dimensional image data is formed from the left eye image data and the right eye image data. The transmission format of the three-dimensional image data is, for example, Side By Side or Top & Bottom. For example, in the transmission format of Side By Side, for a first half in the horizontal direction, pixel data of the left eye image data is transmitted. For a second half in the horizontal direction, pixel data of the right eye image data is transmitted. In contrast, for example, in the transmission format of Top & Bottom, for a first half in the vertical direction, data of each line of the left eye image data is transmitted. For a second half in the vertical direction, data of each line of the right eye image data is transmitted.

If the image data is three-dimensional image data, the data recording medium 111a also includes parallax information in association with the three-dimensional image data. The parallax information is in the form of, for example, a parallax vector indicating the parallax between the left eye image and the right eye image or the depth data. The depth data can be manipulated as a parallax vector after predetermined conversion. The parallax information, for example, is the parallax information on each divided area obtained by dividing a view (an image) into a predetermined number of areas. The parallax information is used, on a receiver side, to adjust the positions of the same superimposition information (e.g., graphics information) superimposed on the left eye image and the right eye image and provide a parallax. The data recording medium 111a is, for example, a disk-shaped recording medium or a semiconductor memory. The data retrieving unit 111 retrieves, for example, the image data, the audio data, and the parallax information from the data recording medium 111a and outputs the image data, the audio data, and the parallax information.

The video encoder 112 performs an MPEG2 encoding process on the image data output from the data retrieving unit 111 and obtains encoded video data. In addition, if the image data is two-dimensional image data, the video encoder 112 generates a video elementary stream including the two-dimensional image data inserted thereinto (a first video stream) using a stream formatter (not shown) disposed downstream of the video encoder 112. In contrast, if the image data is three-dimensional image data, the video encoder 112 generates a video elementary stream including the three-dimensional image data inserted thereinto (a second video stream).

The parallax information encoder 113 generates a parallax information elementary stream including the parallax information output from the data retrieving unit 111. The audio encoder 114 performs an encoding process, such as MPEG-2 Audio AAC, on the audio data output from the data retrieving unit 111 and generates an audio elementary stream.

The graphics generating unit 115 generates data (graphics data) of graphics information (including sub-title information) to be superimposed on the image. The graphics encoder 116 generates a graphics element stream including the graphics data generated in the graphics generating unit 115. At that time, the graphics information serves as superimposition information.

For example, the graphics information represents a logo. The subtitle information represents, for example, a caption. The graphics data is in the form of bitmap data. The graphics data includes idling offset information indicating the position at which the graphic data is superimposed in the image. For example, the idling offset information represents the offset values from the origin point (the upper left corner) of the image to the position at which the uppermost left pixel of the graphics information is superimposed in the vertical direction and the horizontal direction. Note that the standard that defines the caption data as transmitted bitmap data is standardized and used as "DVB_Subtitling", which is a digital broadcast standard in Europe.

The multiplexer 117 packetizes the elementary streams generated by the video encoder 112, the parallax information encoder 113, the audio encoder 114, and the graphics encoder 116. The multiplexer 117 multiplexes the packetized elementary streams and generates the transport stream TS.

During a period of time of a predetermined television program in which the two-dimensional image data is output from the data retrieving unit 111 or a predetermined period of time within the television program, the transport stream TS includes the video elementary stream (the first video stream) having the two-dimensional image data inserted thereinto. In addition, during a period of time of a predetermined television program in which the three-dimensional image data is output from the data retrieving unit 111 or a predetermined period of time within the television program, the transport stream TS includes the video elementary stream (the second video stream) having the three-dimensional image data inserted thereinto.

The multiplexer 117 inserts the above-described first identification information and second identification information into the transport stream TS. Thus, the transport stream TS includes the first identification information and second identification information. As described above, the first identification information is identification information indicating whether the video stream included in the transport stream TS is a first video stream or a second video stream. In addition, the second identification information is identification information indicating whether the first identification information has been inserted. Insertion of the first and second identification information by the multiplexer 117 is described in more detail below.

The operation performed by the transmission data generating unit 110 shown in FIG. 2 is briefly described. Image data output from the data retrieving unit 111 (three-dimensional image data or two-dimensional image data) is supplied to the video encoder 112. The video encoder 112 MPEG2-encodes the image data. Thus, a video elementary stream (an MPEG2 video stream) including the encoded video data is generated.

In this case, if the image data is two-dimensional image data, a video elementary stream including the two-dimensional image data (a first video stream) is generated. In contrast, if the image data is three-dimensional image data, a video elementary stream including the three-dimensional image data (a second video stream) is generated. In this way, the video elementary stream generated by the video encoder 112 is supplied to the multiplexer 117.

In addition, when the three-dimensional image data is output from the data retrieving unit 111, the parallax information corresponding to the three-dimensional image data is also output from the data retrieving unit 111. The parallax information is supplied to the parallax information encoder 113. The parallax information encoder 113 encodes the parallax information in a predetermined manner. Thus, a parallax information elementary stream including the encoded data is generated. The parallax information elementary stream is supplied to the multiplexer 117.

In addition, when the image data is output from the data retrieving unit 111, the audio data corresponding to the image data is also output from the data retrieving unit 111. The audio data is supplied to the audio encoder 114. The audio encoder 114 encodes the audio data using, for example, MPEG-2 Audio AAC. Thus, an audio elementary stream including the encoded audio data is generated. The audio elementary stream is supplied to the multiplexer 117.

In addition, for the image data output from the data retrieving unit 111, the graphics generating unit 115 generates the data (the graphics data) of the graphics information (including the subtitle information) to be superimposed on the image (the view). The graphics data is supplied to the graphics encoder 116. The graphics encoder 116 encodes the graphics data in a predetermined manner. Thus, a graphics elementary stream including the encoded data is generated. The graphics elementary stream is supplied to the multiplexer 117.

The multiplexer 117 packetizes the elementary streams supplied from the encoders and multiplexes the packets. Thus, a transport stream TS is generated. During a period of time of a predetermined television program in which the two-dimensional image data is output from the data retrieving unit 111 or a predetermined period of time within the television program, the stream TS includes the video elementary stream (the first video stream) having the two-dimensional image data inserted thereinto. In addition, during a period of time of a predetermined television program in which the three-dimensional image data is output from the data retrieving unit 111 or a predetermined period of time within the television program, the stream TS includes the video elementary stream (the second video stream) having the three-dimensional image data inserted thereinto.

In addition, in the multiplexer 117, the first identification information indicating whether the video stream is the first video stream or the second video stream is inserted into the transport stream TS. Furthermore, in the multiplexer 117, the second identification information indicating whether the first identification information has been inserted is inserted into the transport stream TS.

[First and Second Identification Information and Insertion Thereof]

As described above, the multiplexer 117 inserts the first and second identification information into the transport stream TS. The multiplexer 117 inserts the first identification information into the picture layer or a sequence layer. That is, according to the present embodiment, the multiplexer 117 inserts the first identification information into the user data area of the picture header or the sequence header of the video elementary stream (the video stream). More specifically, the multiplexer 117 inserts 3D signaling information (Stereo_Video_Format_Signaling( )) including the first identification information into the user data area.

In addition, the multiplexer 117 inserts the second identification information into the transport layer. That is, according to the present embodiment, the multiplexer 117 inserts the second identification information so that the second identification information is located under a video elementary loop (Video ES loop) of a program map table (PMT) included in the transport stream TS. More specifically, the multiplexer 117 inserts a video stream descriptor (Video_stream_descriptor( )) including the second identification information so that the video stream descriptor is located under the video elementary loop.

Figure 3:
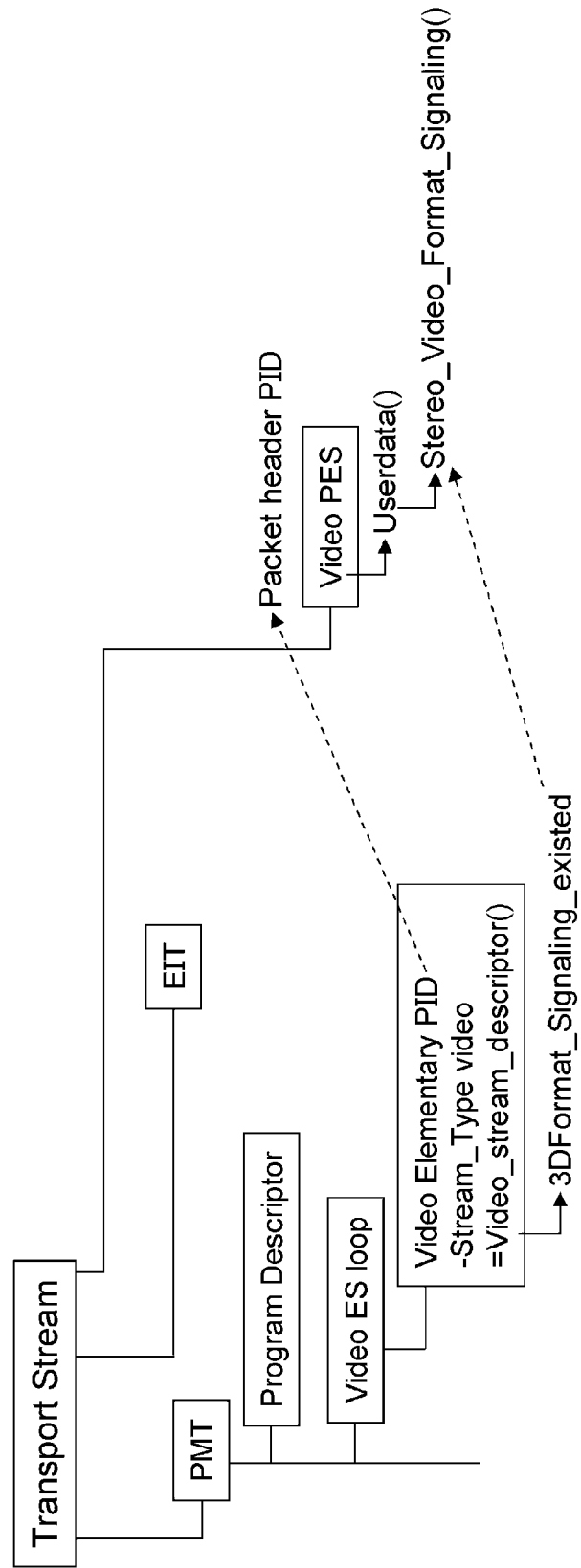
FIG. 3 illustrates an example of the structure of a transport stream TS having first identification information and second identification information inserted thereinto.

FIG. 3 illustrates an example of the structure of the transport stream TS. This example of the structure includes a PES packet "Video PES" of the video elementary stream. In addition, the transport stream TS includes a PMT (Program Map Table) as PSI (Program Specific Information). PSI is information indicating to which program each of the elementary streams included in the transport stream belongs. Furthermore, the transport stream includes an EIT (Event Information Table) serving as SI (Serviced Information). The EIT is used for event-based management.

The PMT includes a program descriptor that describes information related to the entirety of a program. In addition, the PMT includes an elementary loop having information regarding each of the elementary streams. In this example of the structure, the PMT includes a video elementary loop (Video ES loop). In the elementary loop, information such as a packet identifier (PID) and a stream type (Stream_Type) are disposed for each of the streams. In addition, a descriptor that describes information related to the elementary stream is disposed. Note that for simplicity, in the example of the structure, the parallax information, audio information, and graphics are not shown.

In the example of the structure, the 3D signaling information (Stereo_Video_Format_Signaling( )) is inserted into the user data area of the video elementary stream. In addition, in the example of the structure, a video stream descriptor (Video_stream_descriptor) serving as a descriptor that describes information regarding the video elementary stream is inserted into the video elementary loop (Video ES loop) of the PMT.

Figure 4:
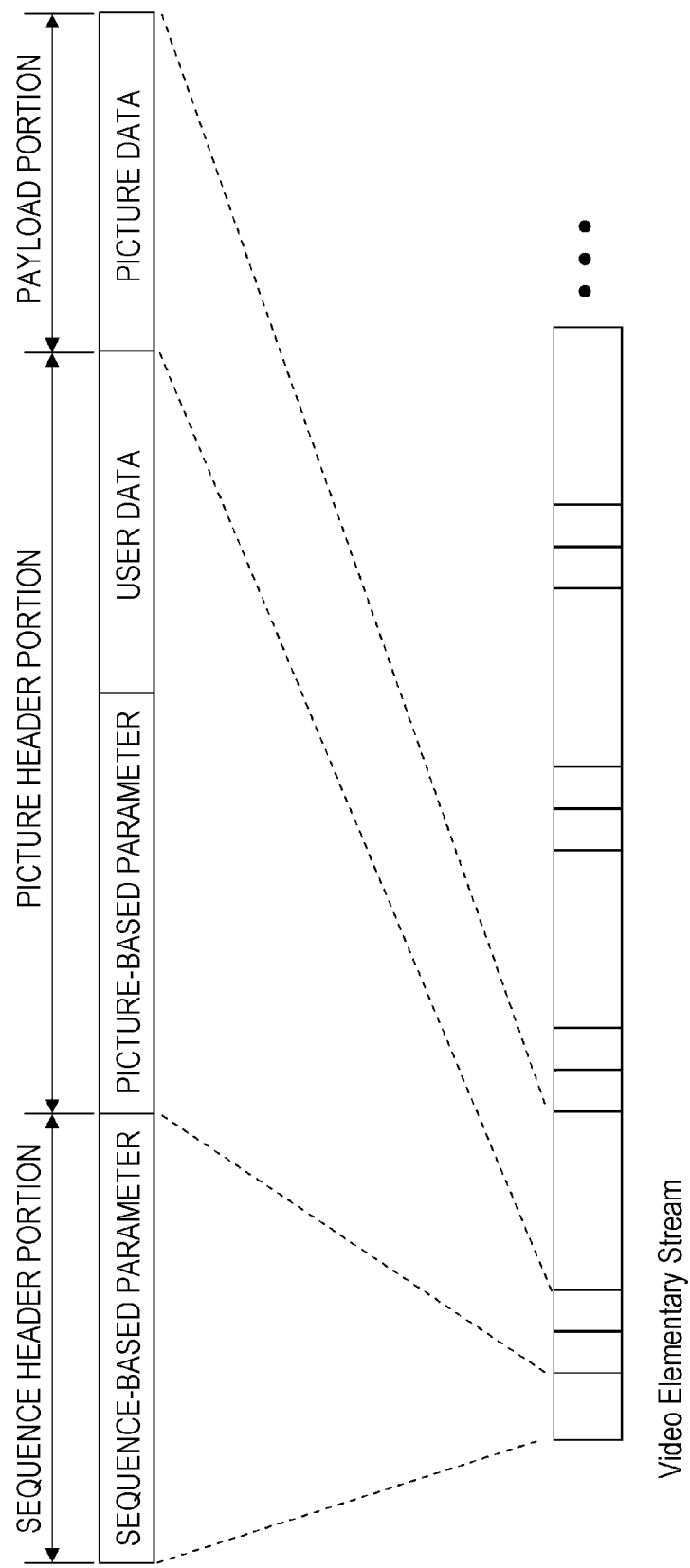
FIG. 4 is a schematic illustration of an example of the structure of a video elementary stream (a video stream).

FIG. 4 is a schematic illustration of an example of the structure of the video elementary stream (Video Elementary Stream). The video elementary stream includes a sequence header portion including a parameter on a per sequence basis (on a per GOP basis). The sequence header portion is followed by a picture header including a parameter and user data on a per picture basis. The picture header is followed by a payload portion including picture data. After the payload portion, a picture header and a payload portion repeatedly appear.

As described above, the 3D signaling information (Stereo_Video_Format_Signaling( )) including the first identification information is inserted into the user data area of the picture header or the sequence header of the video elementary stream (the video stream). FIG. 5 illustrates an example of the structure (the syntax) of the user data (userdata) including the 3D signaling information (Stereo_Video_Format_Signaling( )). If a data identifier that follows the start code (user_data_start_code) is a 3D signaling information identifier, the data identifier is followed by 3D signaling information serving as main data.

FIG. 6 illustrates an example of the structure (the syntax) of the 3D signaling information (Stereo_Video_Format_Signaling( )). FIG. 7 illustrates the 3D signaling information and data defining information (the semantics) for the user data including the 3D signaling information. A unique identifier of 4 bytes (32 bits) is assigned to the 3D signaling information as "Stereo_Video_Format_Signaling identifier". "Stereo_Video_Format_Signaling_Length" represents 8-bit data indicating the length (the size) of the 3D signaling information. This data indicates the number of bytes of the data that follows the "Stereo_Video_Format_Signaling_Length" and indicates the length of the descriptor.

"Stereo_Video_Format_Signaling_type" represents 7-bit data that serves as the first identification information. If the 7-bit data is "0000011", the image data inserted into the video stream is three-dimensional (3D) image data. In addition, the transmission format is "Side by Side". In contrast, if the 7-bit data is "0000100", the image data inserted into the video stream is three-dimensional image data. In addition, the transmission format is "Top and Bottom". Alternatively, if the 7-bit data is "0001000", the image data inserted into the video stream is two-dimensional (2D) image data.

As used herein, the term "Side by Side" refers to a method for reducing each of the left eye image and the right eye image into a half the original size only in the horizontal direction and placing the images on the left side and the right side of a screen. In this case, for example, the left image of the two screen images for the viewer is defined as the left eye image, and the right image of the two screen images is defined as the right eye image. In addition, for example, the border line extending between the two screen images is located at ½ of the effective sampling number for one scan line. FIG. 8 illustrates a particular example of a technique for dividing a screen. For example, primarily, at a reduction time, the sampling positions of two screens are the same and are fixed among the scan lines.

In addition, as used herein, the term "Top & Bottom" refers to a method for reducing each of the left eye image and the right eye image into a half the original size only in the vertical direction and placing the images on the upper side and the lower side of a screen. In this case, for example, the upper image of the two screen images for the viewer is defined as the left eye image, and the lower image of the two screen images is defined as the right eye image. In addition, for example, the border line extending between the two screen images is located at ½ of the number of lines of one effective screen in the vertical direction. FIG. 8 illustrates a particular example of a technique for dividing a screen.

As described above, 7-bit data "Stereo_Video_Format_Signaling_type" indicates whether the image data inserted into the video stream is three-dimensional image data or two-dimensional image data. Accordingly, by using the 7-bit data, it can be determined whether the video stream included in the transport stream TS is the first video stream or the second video stream.

Note that when switch is made between a two-dimensional image and a three-dimensional image, the frame in which picture data (Picture data( )) is changed is made to be the same as the frame in which the 3D signaling information (Stereo_Video_Format_Signaling( )) is changed.

FIG. 9 illustrates an example of the structure (the syntax) of a video stream descriptor (Video_stream_descriptor( )). The descriptor itself is defined in the MPEG2 standard. According to the present embodiment, for the video stream descriptor, 1-bit flag data "3DFormat_Signaling_existed" is additionally defined. The flag data serves as the second identification information. The flag data "1" indicates that the user data area of the video stream includes the 3D signaling information inserted thereinto. In contrast, the flag data "0" indicates that the user data area of the video stream does not include the 3D signaling information inserted thereinto.

Figure 10:
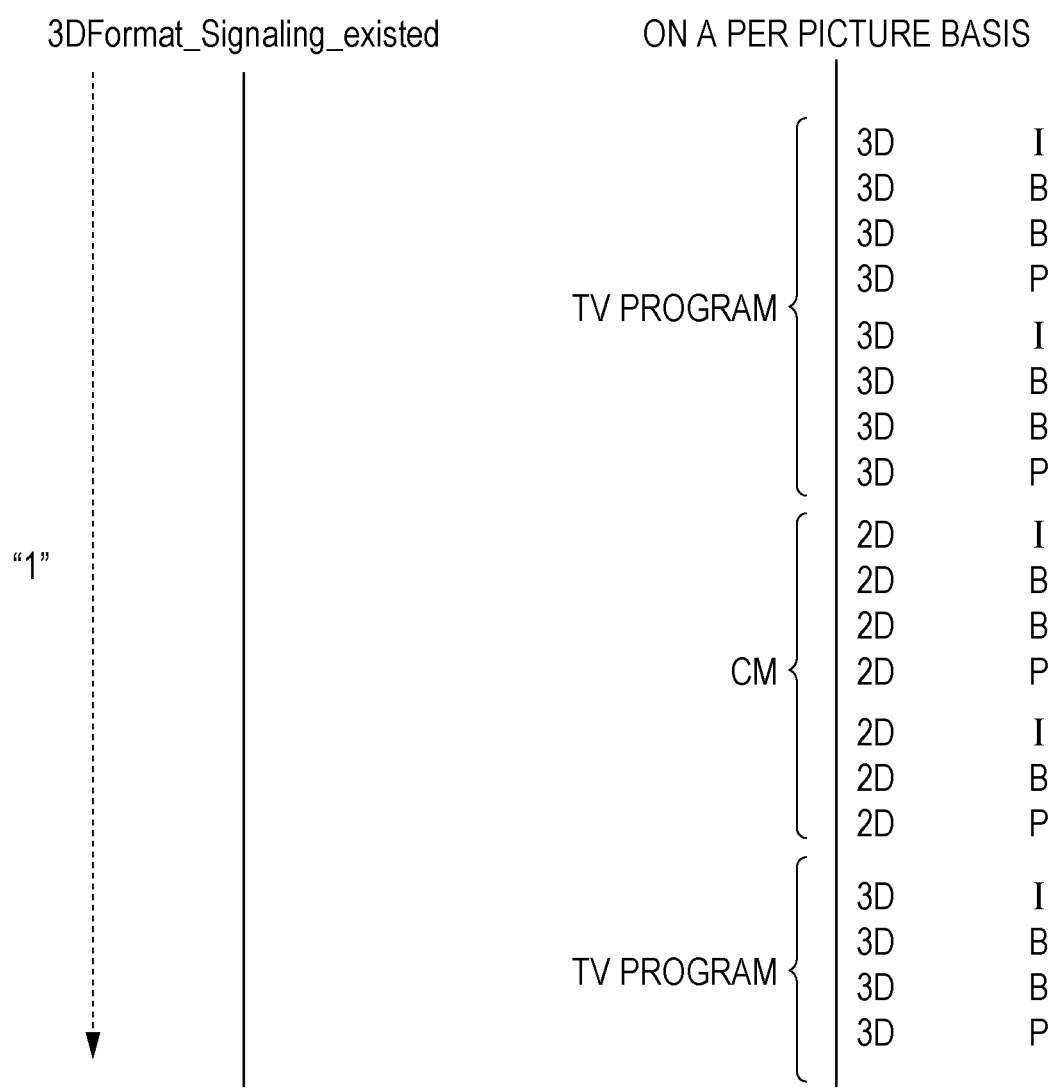
FIG. 10 illustrates an example of the user data area of the picture header of a video stream having the 3D signaling information inserted thereinto, that is, a video stream having the 3D signaling information inserted thereinto on a per picture basis.

FIG. 10 illustrates an example of the user data area of the picture header of a video stream having the 3D signaling information inserted thereinto, that is, a video stream having the 3D signaling information inserted thereinto on a per picture basis. In this example, for a TV programs, three-dimensional (3D) image data is transmitted. However, for a CM (commercial message), two-dimensional (2D) image data is transmitted. In addition, when the signaling information is inserted into the user data area of the picture header, the 1-bit flag data "3DFormat_Signaling_existed" is set to "1".

Figure 11:
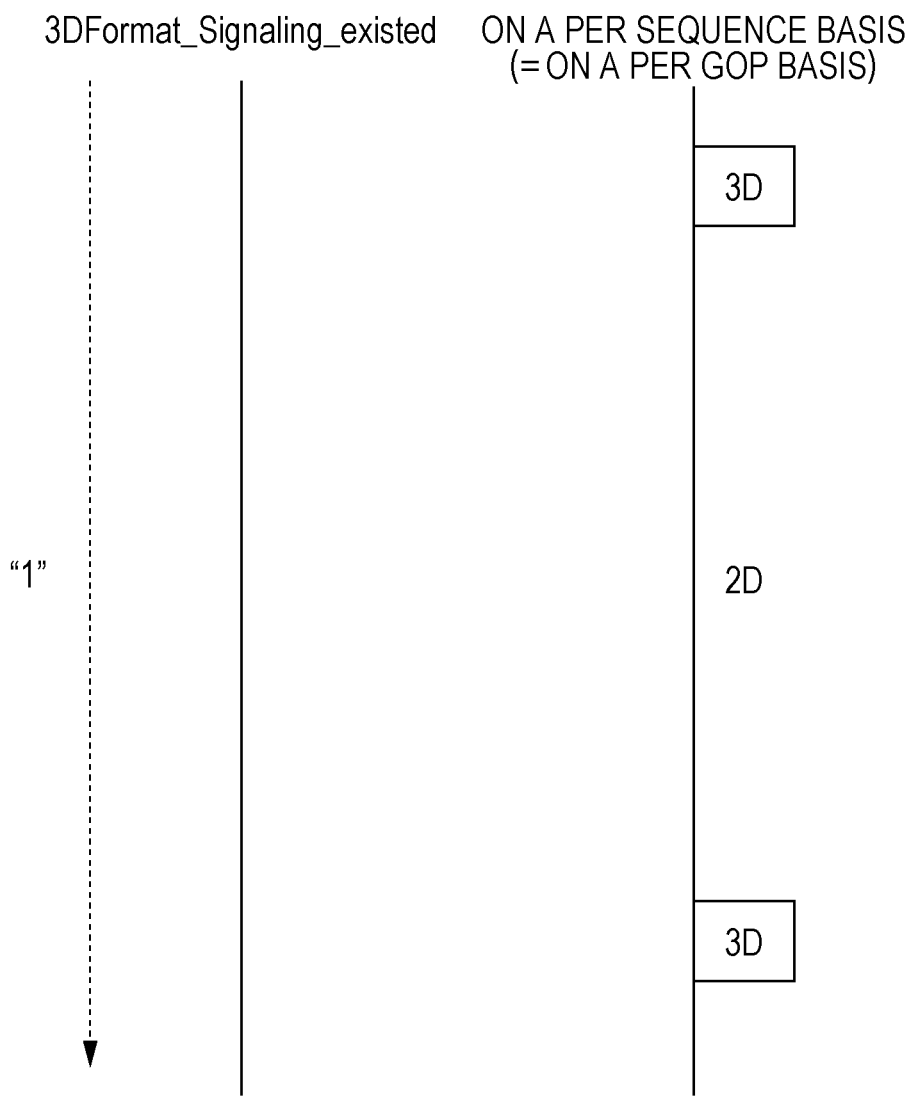
FIG. 11 illustrates an example of the user data area of the sequence header of a video stream having the 3D signaling information inserted thereinto, that is, a video stream having the 3D signaling information inserted thereinto on a per sequence basis.

FIG. 11 illustrates an example of the user data area of the sequence header of a video stream having the 3D signaling information inserted thereinto, that is, a video stream having the 3D signaling information inserted thereinto on a per sequence basis. In this example, when the signaling information is inserted into the user data area of the sequence header, the 1-bit flag data "3DFormat_Signaling_existed" is set to "1".

[Example of Configuration of Receiver]

Figure 12:
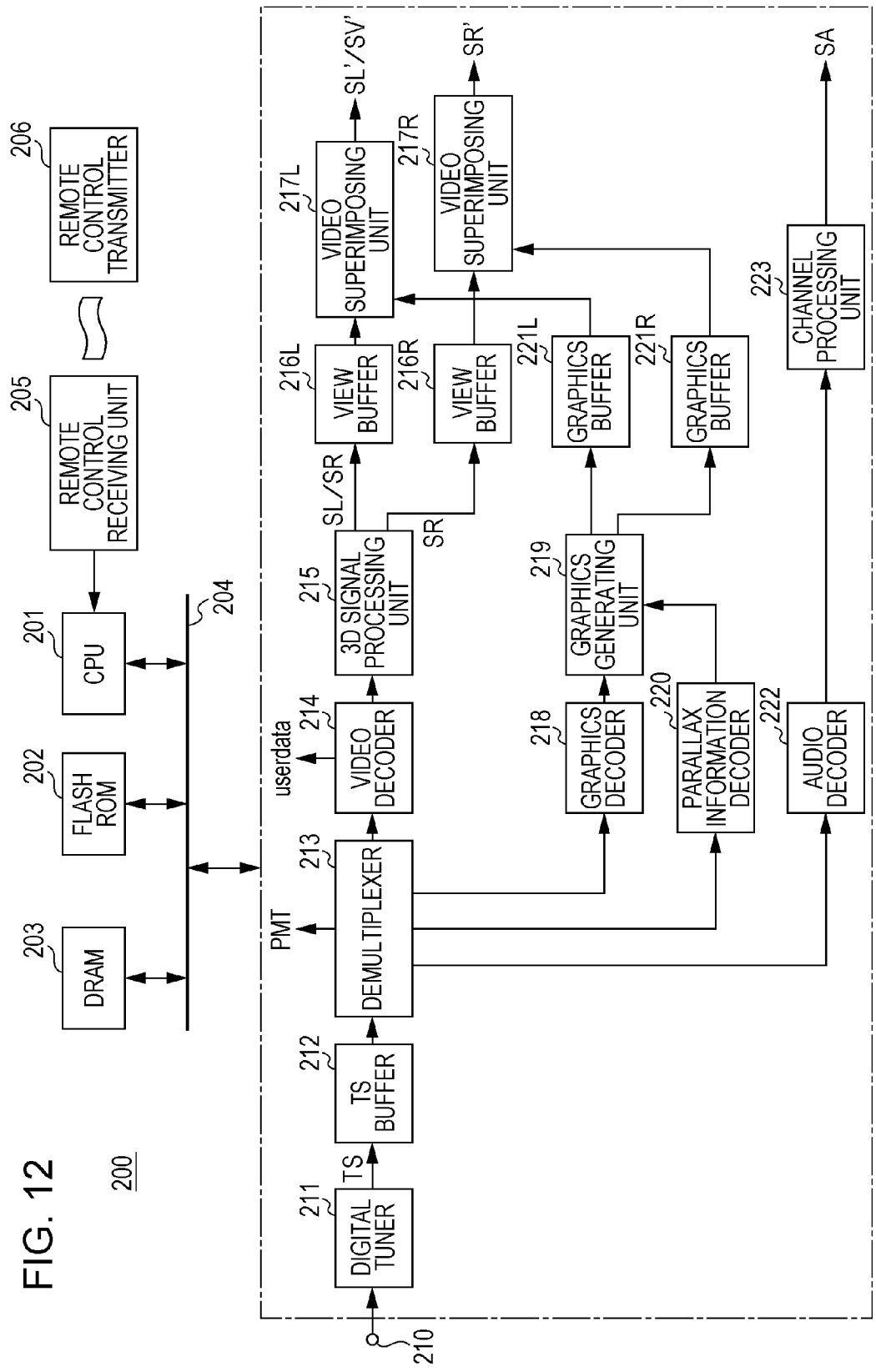
FIG. 12 is a block diagram illustrating an example of the configuration of a receiver of the image transmitting/receiving system.

FIG. 12 illustrates an example of the configuration of the receiver 200. The receiver 200 includes a CPU 201, a flash ROM 202, a DRAM 203, an internal bus 204, a remote control receiving unit 205, and a remote control transmitter 206. In addition, the receiver 200 includes an antenna terminal 210, a digital tuner 211, a transport stream buffer (TS buffer) 212, and a demultiplexer 213.

Furthermore, the receiver 200 includes a video decoder 214, a 3D signal processing unit 215, view buffers 216L and 216R, and video superimposing units 217L and 217R. Still furthermore, the receiver 200 includes a graphics decoder 218, a graphics generating unit 219, a parallax information decoder 220, graphics buffers 221L and 221R, an audio decoder 222, and a channel processing unit 223.

The CPU 201 controls the operations of all units of the receiver 200. The flash ROM 202 stores the control software and holds data. The DRAM 203 serves as a work area of the CPU 201. The CPU 201 loads the software and data read out of the flash ROM 202 into the DRAM 203 and starts the software. In this way, the CPU 201 controls all of the units of the receiver 200. The remote control receiving unit 205 receives a remote control signal (remote control code) transmitted from the remote control transmitter 206 and supplies the remote control code to the CPU 201. The CPU 201 controls all of the units of the receiver 200 on the basis of the remote control code. The CPU 201, the flash ROM 202, and the DRAM 203 are connected to the internal bus 204.

The antenna terminal 210 receives a television broadcast signal received by a reception antenna (not shown). The digital tuner 211 processes the television broadcast signal input to the antenna terminal 210 and outputs a predetermined transport stream (bit stream data) TS corresponding to a channel selected by a user. The transport stream buffer (TS buffer) 212 temporarily stores the transport stream TS output from the digital tuner 211.

As described above, the transport stream TS includes the first video stream (an elementary stream) having two-dimensional image data inserted thereinto and the second video stream (an elementary stream) having three-dimensional image data inserted thereinto in a time multiplexed manner. In addition, the transport stream TS includes the first identification information and the second identification information inserted thereinto (refer to FIG. 3). The first identification information is identification information indicating whether the video stream is the first video stream or the second video stream. The second identification information is identification information indicating whether the first identification information has been inserted or not.

The 3D signaling information (Stereo_Video_Format_Signaling( )) is inserted into the user data area of the picture header or the sequence header of each of the first video stream and the second video stream included in the transport stream TS. The 3D signaling information includes the 7-bit data "Stereo_Video_Format_Signaling_type" serving as the first identification information (refer to FIG. 6).

In addition, the video stream descriptor (Video_stream_descriptor( )) is inserted and placed under the video elementary loop (Video ES loop) of a program map table (PMT) included in the transport stream TS. The descriptor includes the 1-bit flag data "3DFormat_Signaling_existed" serving as the second identification information (refer to FIG. 9).

The demultiplexer 213 extracts the video elementary stream, the parallax information elementary stream, the graphics elementary stream, and the audio elementary stream from the transport stream TS temporarily stored in the transport stream buffer 212. The parallax information elementary stream is extracted only when the video stream (the video elementary stream) included in the transport stream TS is a second video stream having three-dimensional (3D) image data inserted thereinto.

In addition, the demultiplexer 213 extracts a program map table (PMT) from the transport stream TS and supplies the information in the table to the CPU 201. As described above, the table also includes a video stream descriptor (Video_stream_descriptor( )) having the 1-bit flag data "3DFormat_Signaling_existed" that serves as the second identification information. The CPU 201 determines, on the basis of the 1-bit flag data "3DFormat_Signaling_existed", whether the 3D signaling information (Stereo_Video_Format_Signaling( )) has been inserted into the user data area of the picture header or the sequence header of the video stream.

The video decoder 214 performs a process that is the reverse of the above-described process performed by the video encoder 112 of the transmission data generating unit 110. That is, the video decoder 214 performs a decoding process on the encoded image data included in the video elementary stream (the video stream) extracted by the demultiplexer 213. Thus, the video decoder 214 obtains decoded image data.

In addition, the video decoder 214 extracts user data (user-data) included in the user data area of the picture header or the sequence header of the video stream and supplies the user data to the CPU 201. As described above, the user data includes the 3D signaling information (Stereo_Video_Format_Signaling( )) having the 7-bit data "Stereo_Video_Format_Signaling_type" serving as the first identification information.

If the 1-bit flag data "3DFormat_Signaling_existed" serving as the second identification information is set to "1", the 7-bit data "Stereo_Video_Format_Signaling_type" serving as the first identification information is present. If the 1-bit flag data "3DFormat_Signaling_existed" is set to "1", the CPU 201 determines whether the video stream is the first video stream having two-dimensional image data inserted thereinto or the second video stream having three-dimensional image data inserted thereinto on the basis of the 7-bit data "Stereo_Video_Format_Signaling_type".

If it is determined that the 7-bit data is "0001000" and, therefore, the video stream is the first video stream having two-dimensional image data inserted thereinto, the CPU 101 sets all of the units of the receiver 200 to enter a mode for performing the two-dimensional image process. However, if it is determined that the 7-bit data is "0000011" or "0000100" and, therefore, the video stream is the second video stream having three-dimensional image data inserted thereinto, the CPU 101 sets all of the units of the receiver 200 to enter a mode for performing the three-dimensional image process.

Figure 13:
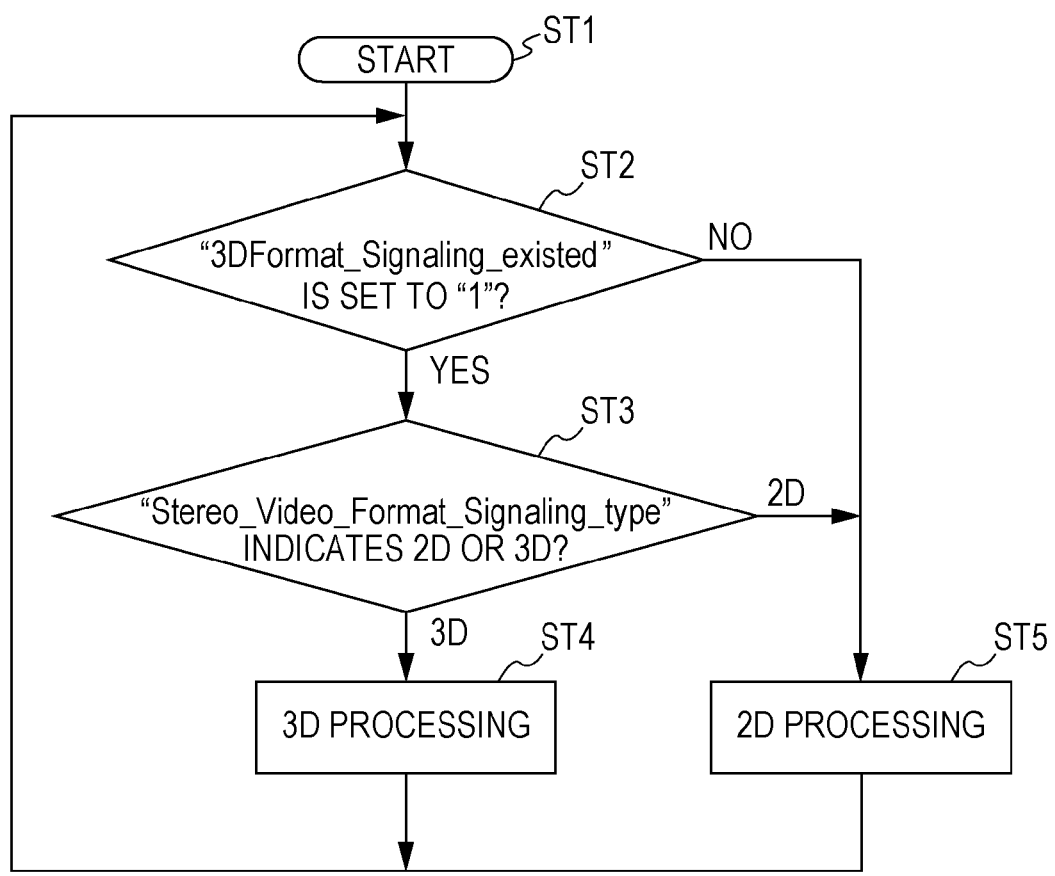
FIG. 13 is a flowchart illustrating an example of the control process performed by a CPU on the basis of the first identification information and the second identification information.

The flowchart shown in FIG. 13 illustrates the control process performed by the CPU 201. In step ST1, the CPU 201 starts processing. Thereafter, the processing proceeds to step ST2. In step ST2, the CPU 201 determines whether the 1-bit flag data "3DFormat_Signaling_existed" is set to "1". If "3DFormat_Signaling_existed"=1, the processing of the CPU 201 proceeds to step ST3.

In step ST3, the CPU 201 determines whether "Stereo_Video_Format_Signaling_type" indicates that the image data inserted into the video stream is two-dimensional (2D) image data or three-dimensional (3D) image data. If "Stereo_Video_Format_Signaling_type" indicates that the image data inserted into the video stream is three-dimensional (3D) image data, the processing of the CPU 201 proceeds to step ST4. In step ST4, the CPU 201 sets all of the units of the receiver 200 to enter a mode for performing the three-dimensional image process. Thereafter, the processing returns to step ST2.

However, if, in step ST2, "3DFormat_Signaling_existed"=0, the processing of the CPU 201 proceeds to step ST5. Alternatively, if, in step ST3, "Stereo_Video_Format_Signaling_type" indicates that the image data is two-dimensional image data, the processing of the CPU 201 proceeds to step ST5. In step ST5, the CPU 201 sets all of the units of the receiver 200 to enter a mode for performing the two-dimensional image process. Thereafter, the processing returns to step ST2.

Referring back to FIG. 12, if the image data output from the video decoder 214 is three-dimensional image data, the 3D signal processing unit 215 performs a process corresponding to the transmission format and generates left eye image data SL and right eye image data SR. Note that if the image data output from the video decoder 214 is two-dimensional image data, the 3D signal processing unit 215 directly outputs the two-dimensional image data.

In the mode for performing the three-dimensional image process set through the control of the CPU 201, the view buffer 216L temporarily stores the left eye image data SL generated by the 3D signal processing unit 215. Alternatively, in the mode for performing the two-dimensional image process set through the control of the CPU 201, the view buffer 216L temporarily stores two-dimensional image data SV output from the 3D signal processing unit 215. Furthermore, in the mode for performing the three-dimensional image process set through the control of the CPU 201, the view buffer 216R temporarily stores the right eye image data SR generated by the 3D signal processing unit 215.

The graphics decoder 218 performs a process that is the reverse of the above-described process performed by the graphics encoder 116 of the transmission data generating unit 110. That is, the graphics decoder 218 performs a decoding process on the encoded graphics data included in the graphics elementary stream extracted by the demultiplexer 213. Thus, the graphics decoder 218 obtains decoded graphics data (including subtitle data).

The parallax information decoder 220 performs a process that is the reverse of the above-described process performed by the parallax information encoder 113 of the transmission data generating unit 110. That is, the parallax information decoder 220 performs a decoding process on the encoded parallax information included in the parallax information elementary stream extracted by the demultiplexer 213. Thus, the parallax information decoder 220 obtains decoded parallax information. The parallax information is in the form of, for example, a parallax vector indicating the parallax between the left eye image and the right eye image or the depth data. The depth data can be manipulated as a parallax vector after predetermined conversion. The parallax information, for example, is the parallax information on each divided area obtained by dividing a view (an image) into a predetermined number of areas.

The graphics generating unit 219 generates data of the graphics information to be superimposed on the image on the basis of the graphics data obtained in the graphics decoder 218. In the mode for performing the three-dimensional image process set through the control of the CPU 201, the graphics generating unit 219 generates data of the graphics information to be superimposed on each of the left eye image data and the right eye image data. In this case, the graphics generating unit 219 adjusts the position at which the graphics information is superimposed in each of the left eye image and the right eye image on the basis of the parallax information obtained by the parallax information decoder 220. Thus, a parallax is provided on each of the left eye image and the right eye image. In addition, in the mode for performing the two-dimensional image process set through the control of the CPU 201, the graphics generating unit 219 generates the data of the graphics information to be superimposed on the two-dimensional image data.

In the mode for performing the three-dimensional image process set through the control of the CPU 201, the graphics buffer 221L temporarily stores the data of the graphics information to be superimposed on the left eye image data generated by the graphics generating unit 219. Alternatively, in the mode for performing the two-dimensional image process set through the control of the CPU 201, the graphics buffer 221L temporarily stores the data regarding the graphics information to be superimposed on the two-dimensional image data generated by the graphics generating unit 219. Furthermore, in the mode for performing the three-dimensional image process set through the control of the CPU 201, the graphics buffer 221R temporarily stores the data of the graphics information to be superimposed on the right eye image data.

In the mode for performing the three-dimensional image process set through the control of the CPU 201, the video superimposing unit 217L outputs image data SL' for displaying the left eye image having the graphics information superimposed thereon. At that time, the video superimposing unit 217L superimposes the data of the graphics information stored in the graphics buffer 221L on the left eye image data SL stored in the view buffer 216L. Thus, the video superimposing unit 217L obtains the left eye image data SL'. Alternatively, in the mode for performing the two-dimensional image process set through the control of the CPU 201, the video superimposing unit 217L outputs two-dimensional image data SV' for displaying the two-dimensional image having the graphics information superimposed thereon. At that time, the video superimposing unit 217L superimposes the data of the graphics information stored in the graphics buffer 221L on the two-dimensional image data SV stored in the view buffer 216L. Thus, the video superimposing unit 217L obtains the two-dimensional image data SV'.

Furthermore, in the mode for performing the three-dimensional image process set through the control of the CPU 201, the video superimposing unit 217R outputs right eye image data SR' for displaying the right eye image having the graphics information superimposed thereon. At that time, the video superimposing unit 217R superimposes the data of the graphics information stored in the graphics buffer 221R on the right eye image data SR stored in the view buffer 216R.

The audio decoder 222 performs a process that is the reverse of the above-described process performed by the audio encoder 114 of the transmission data generating unit 110. That is, the audio decoder 222 performs a decoding process on the encoded audio data included in the audio elementary stream extracted by the demultiplexer 213. Thus, the audio decoder 222 obtains the decoded audio data. The channel processing unit 223 generates and outputs audio data SA for each of the channels that realize, for example, 5.1ch surround sound for the audio data obtained in the audio decoder 222.

The operation performed by the receiver 200 is briefly described next. The television broadcast signal input to the antenna terminal 210 is supplied to the digital tuner 211. The digital tuner 211 processes the television broadcast signal and outputs a predetermined transport stream TS corresponding to the channel selected by the user. The transport stream TS is temporarily stored in the TS buffer 212.

The demultiplexer 213 extracts the video elementary stream, the parallax information elementary stream, the graphics elementary stream, and the audio elementary stream from the transport stream TS temporarily stored in the TS buffer 212. The parallax information elementary stream is extracted only when the transport stream TS includes a video stream having three-dimensional image data inserted thereinto (a second video stream).

In addition, the demultiplexer 213 extracts the program map table (PMT) from the transport stream TS and supplies the information in the table to the CPU 201. As described above, the table also includes a video stream descriptor (Video_stream_descriptor( )) having the 1-bit flag data "3DFormat_Signaling_existed" that serves as the second identification information (refer to FIG. 9). The CPU 201 determines, on the basis of the 1-bit flag data "3DFormat_Signaling_existed", whether the 3D signaling information (Stereo_Video_Format_Signaling( )) has been inserted into the user data area of the picture header or the sequence header of the video stream.

The video elementary stream (the video stream) extracted by the demultiplexer 213 is supplied to the video decoder 214. The video decoder 214 performs a decoding process on the encoded image data included in the video elementary stream extracted by the demultiplexer 213. Thus, the video decoder 214 obtains decoded image data. In this case, if the video elementary stream has three-dimensional image data inserted thereinto, the three-dimensional image data is obtained. In contrast, in this case, if the video elementary stream has two-dimensional image data inserted thereinto, the two-dimensional image data is obtained.

In addition, the video decoder 214 extracts the user data included in the user data area of the picture header or the sequence header of the video stream. The user data is supplied to the CPU 201. As described above, the user data includes the 3D signaling information (Stereo_Video_Format_Signaling( )) having the 7-bit data "Stereo_Video_Format_Signaling_type" serving as the first identification information (refer to FIG. 6).

If the 1-bit flag data "3DFormat_Signaling_existed" is set to "1", the CPU 201 identifies the video stream using the 7-bit data "Stereo_Video_Format_Signaling_type". The CPU 201 identifies whether the video stream is the first video stream having two-dimensional image data inserted thereinto or the second video stream having three-dimensional image data inserted thereinto on the basis of the 7-bit data.

If the 7-bit data is "0001000" and, therefore, the video stream is a first video stream having two-dimensional image data inserted thereinto, the CPU 101 sets all of the units of the receiver 200 to enter a mode for performing the two-dimensional image process. In contrast, if the 7-bit data is "0000011" or "0000100" and, therefore, the video stream is a second video stream having three-dimensional image data inserted thereinto, the CPU 101 sets all of the units of the receiver 200 to enter a mode for performing the three-dimensional image process.

The case in which all of the units of the receiver 200 are set to enter a mode for performing the three-dimensional (3D) image process is described below first. The three-dimensional image data obtained by the video decoder 214 is supplied to the 3D signal processing unit 215. If the image data output from the video decoder 214 is three-dimensional image data, the 3D signal processing unit 215 performs a process corresponding to the transmission format and generates the left eye image data SL and the right eye image data SR. The left eye image data SL is temporarily stored in the view buffer 216L, and the right eye image data SR is temporarily stored in the view buffer 216R.

In addition, the graphics elementary stream extracted by the demultiplexer 213 is supplied to the graphics decoder 218. The graphics decoder 218 performs a decoding process on the encoded graphics data included in the graphics elementary stream. Thus, the graphics decoder 218 obtains decoded graphics data (including subtitle data). The graphics data is supplied to the graphics generating unit 219.

In addition, the parallax information elementary stream extracted by the demultiplexer 213 is supplied to the parallax information decoder 220. The parallax information decoder 220 performs a decoding process on encoded parallax information included in the parallax information elementary stream. Thus, the parallax information decoder 220 obtains decoded parallax information. The parallax information is supplied to the graphics generating unit 219.

The graphics generating unit 219 generates the data of the graphics information to be superimposed on the image on the basis of the graphics data obtained by the graphics decoder 218. In this case, the graphics generating unit 219 adjusts the position at which the graphics information is superimposed in each of the left eye image and the right eye image on the basis of the parallax information obtained in the parallax information decoder 220. Thus, a parallax is provided on each of the left eye image and the right eye image.

The data of the graphics information that is to be superimposed on the left eye image data and that is generated by the graphics generating unit 219 is temporarily stored in the graphics buffer 221L. In addition, the data of the graphics information that is to be superimposed on the right eye image data and that is generated by the graphics generating unit 219 is temporarily accumulated in the graphics buffer 221R.

The video superimposing unit 217L superimposes the data of the graphics information accumulated in the graphics buffer 221L on the left eye image data SL accumulated in the view buffer 216L. Thus, left eye image data SL' can be obtained. The left eye image data SL' is output as image data used for displaying the left eye image having the graphics information superimposed thereon. In addition, the video superimposing unit 217R superimposes the data of the graphics information accumulated in the graphics buffer 221R on the right eye image data SR accumulated in the view buffer 216R. Thus, right eye image data SR' can be obtained. The right eye image data SR' is output as image data used for displaying the right eye image having the graphics information superimposed thereon.

The case in which all of the units of the receiver 200 enter a mode for performing the two-dimensional (2D) image process is described next. The two-dimensional image data SV obtained in the video decoder 214 is directly output from the 3D signal processing unit 215. The two-dimensional image data SV is temporarily accumulated in the view buffer 216L.

In addition, the graphics elementary stream extracted by the demultiplexer 213 is supplied to the graphics decoder 218. The graphics decoder 218 performs a decoding process on the encoded graphics data included in the graphics elementary stream. Thus, decoded graphics data (including subtitle data) can be obtained. The graphics data is supplied to the graphics generating unit 219.

The graphics generating unit 219 generates the data of the graphics information to be superimposed on the image on the basis of the graphics data obtained in the graphics decoder 218. The data of the graphics information is temporarily accumulated in the graphics buffer 221L.

The video superimposing unit 217L superimposes the data of the graphics information accumulated in the graphics buffer 221L on the two-dimensional image data SV accumulated in the view buffer 216L. Thus, two-dimensional image data SV' can be obtained. The two-dimensional image data SV' is output as image data used for displaying a two-dimensional image having the graphics information superimposed thereon.

In addition, the audio elementary stream extracted in the demultiplexer 213 is supplied to the audio decoder 222. The audio decoder 222 performs a decoding process on the encoded audio data included in the audio elementary stream. Thus, decoded audio data can be obtained. The audio data is supplied to the channel processing unit 223. For the audio data, the channel processing unit 223 generates and outputs audio data SA for each of the channels that realize, for example, 5.1ch surround sound.

As described above, in the image transmitting/receiving system 10 shown in FIG. 1, the first identification information is inserted into the transport stream TS to be transmitted from the broadcast station 100. The first identification information is identification information indicating whether the video stream is the first video stream having two-dimensional image data inserted thereinto or the second video stream having three-dimensional image data inserted thereinto.

More specifically, the 3D signaling information including the 7-bit data "Stereo_Video_Format_Signaling_type" serving as the first identification information is inserted into the user data area of the picture header or the sequence header of a video stream included in the transport stream TS. Accordingly, on the receiver side, it can be easily determined whether the received image data is two-dimensional image data or three-dimensional image data on the basis of the first identification information. Even when the received image data is switched from two-dimensional image data to three-dimensional image data or vice versa in a time multiplexed manner, an appropriate process can be performed at all times.

In addition, in the image transmitting/receiving system 10 shown in FIG. 1, the second identification information that indicates whether the first identification information has been inserted is inserted into the transport stream TS to be transmitted from the broadcast station 100. More specifically, a video stream descriptor including the 1-bit flag data "3DFormat_Signaling_existed" serving as the second identification information is inserted and placed under the video elementary loop of the PMT.

Therefore, only when the second identification information indicates that the first identification information has been inserted, the first identification information can be acquired on the receiver side and the process performed on the received image data can be switched to an appropriate process on the basis of the first identification information. That is, if the second identification information indicates that the first identification information has not been inserted, the need for acquiring the first identification information and monitoring the information can be eliminated on the receiver side. Therefore, an efficient process can be performed.

In addition, if the transport stream TS transmitted from the broadcast station 100 includes a video stream having three-dimensional image data inserted thereinto, the parallax information can be further inserted into the transport stream TS in the image transmitting/receiving system 10 shown in FIG. 1. The parallax information is used to add parallax to the same superimposition information that is to be superimposed on the image formed from the left eye image data and the image formed from the right eye image data (the left eye image data and the right eye image data constitute the three-dimensional image data).

In this case, the three-dimensional image data and the parallax information corresponding to the three-dimensional image data are transmitted to the receiver side. Accordingly, the positions of the superimposition information to be superimposed on the left eye image data and the right eye image data on the receiver side have already been adjusted on the basis of the parallax information. Therefore, when the superimposition information is displayed, the integrity of the perspective among the objects in the stereoscopic image can be maintained in an optimum state.

Furthermore, in the image transmitting/receiving system 10 shown in FIG. 1, the receiver 200 acquires, from the transport stream TS, the first identification information indicating whether the video stream is the first video stream or the second video stream. Thereafter, the two-dimensional image process or the three-dimensional image process is selectively performed on the received image data on the basis of the first information. Accordingly, the receiver 200 can perform an optimum process at all times even when the received image data is switched from two-dimensional image data to three-dimensional image data or vice versa in a time multiplexed manner.

Furthermore, in the image transmitting/receiving system 10 shown in FIG. 1, the receiver 200 acquires, from the transport stream TS, the second identification information indicating whether the first identification information has been inserted. Only when the second identification information indicates that the first identification information has been inserted, the receiver 200 acquires the first identification information and monitors the information. Accordingly, if the second identification information indicates that the first identification information has not been inserted, the receiver 200 need not acquire the first identification information and need not monitor the information. Thus, an efficient process can be performed.

Still furthermore, in the image transmitting/receiving system 10 shown in FIG. 1, when a transport stream TS1 including a video stream (the second video stream) having three-dimensional (3D) image data inserted thereinto is transmitted, the receiver 200 enters a mode for processing the three-dimensional image data. In addition, the graphics generating unit 219 adjusts the position at which the graphics information is superimposed in each of the left eye image and the right eye image on the basis of the parallax information obtained in the parallax information decoder 220: Thus, a parallax is provided on each of the left eye image and the right eye image. Thus, the integrity of the perspective among the objects in the stereoscopic image can be maintained in an optimum state.

Yet still furthermore, in the image transmitting/receiving system 10 shown in FIG. 1, when the receiver 200 adjusts the position at which the graphics information is superimposed in each of the left eye image and the right eye image, the parallax information inserted into the transport stream TS is extracted and used. Accordingly, the receiver 200 need not obtain the parallax information by, for example, processing the left eye image data and the right eye image data and, therefore, the receiver 200 can simply and easily adjust the position at which the data of the superimposition information is superimposed.

2. Modifications

Note that while the above embodiment has been described with reference to the first identification information inserted into the user data area of the picture header or the sequence header of the video stream included in the transport stream TS, the location at which the first identification information is inserted is not limited to the picture header or the sequence header of the video stream.

In addition, while the above embodiment has been described with reference to the first identification information formed from the 7-bit data "Stereo_Video_Format_Signaling_ type" included in the 3D signaling information, the first identification information is not limited to the 7-bit data "Stereo_Video_Format_Signaling_type". The point is that the first identification information may be any information by which it can be identified whether the video stream included in the transport stream TS is the first video stream having two-dimensional image data inserted thereinto or the second video stream having three-dimensional image data inserted thereinto.

Furthermore, while the above embodiment has been described with reference to an example in which the second identification information is inserted into a descriptor placed under the video elementary loop of the PMT, the location at which the second identification information is inserted is not limited thereto. That is, the second identification information may be transmitted using the SI (Service Information) transmitted on a per program basis. For example, the second identification information may be inserted into the descriptor placed under a service description table (SDT) included in the transport stream TS. Alternatively, for example, the second identification information may be inserted into the descriptor placed under an event information table (EIT) included in the transport stream TS.

Still furthermore, while the above embodiment has been described with reference to the second identification information formed from the 1-bit flag data "3DFormat_Signaling_existed" included in the video stream descriptor, the second identification information is not limited to the 1-bit flag data "3DFormat_Signaling_existed". The point is that any information by which it can be identified whether the first identification information has been inserted into the transport stream TS may be used.

Still furthermore, while the above embodiment has been described with reference to a container formed from a transport stream (MPEG-2 TS), the present invention is similarly applicable to systems having a configuration in which a video stream is distributed to reception terminals using a network, such as the Internet. In general, in distribution via the Internet, a container having an MP4 format or a format other than MP4 is used. That is, as the containers, the transport stream (MPEG-2 TS) employed as a digital broadcast standard and containers having a variety of formats, such as MP4, employed in Internet distribution can be used.

Still furthermore, while the above embodiment has been described with reference to an example in which the video stream is an MPEG2 video stream, the video stream is not limited to an MPEG2 video stream. For example, the video stream may be a video stream of VC-1 or MPEG4-visual, or a video stream based on another encoding method.

Still furthermore, while the above embodiment has been described with reference to the example in which the superimposition information is formed from a graphic, the same can apply even when other types of superimposition information, such as a closed caption, is used. Yet still furthermore, while the above embodiment has been described with reference to the example in which graphic data is transmitted from the transmitter side together with the image data, the data of the superimposition information may be OSD display data generated on the receiver side.

INDUSTRIAL APPLICABILITY

The present invention is applicable to a stereoscopic image data transmitting/receiving system in which stereoscopic image data is transmitted using broadcast waves or a network, such as the Internet.

REFERENCE SIGNS LIST 10 image transmitting/receiving system
100 broadcast station
110 transmission data generating unit
111 data retrieving unit
111a data recording medium
112 video encoder
113 parallax information encoder
114 audio encoder
115 graphics generating unit
116 graphics encoder
117 multiplexer
200 receiver
201 CPU
202 flash ROM
203 DRAM
204 internal bus
205 remote control receiver
206 remote control transmitter
210 antenna terminal
211 digital tuner
212 transport stream buffer (TS buffer)
213 demultiplexer
214 video decoder
215 3D signal processing unit
216L, 216R view buffer
217L, 217R video superimposing unit
218 graphics decoder
219 graphics generating unit
220 parallax information decoder
221L, 221R graphics buffer
222 audio decoder
223 channel processing unit

The invention claimed is:

1. A transmitting apparatus comprising:
a transmitting unit configured to transmit a container having a predetermined format and including a first video stream having two-dimensional image data inserted thereinto and a second video stream having three-dimensional image data inserted thereinto in a time multiplexed manner;
a first identification information inserting unit configured to insert, into the container, first identification information used for identifying whether a video stream is the first video stream or the second video stream; and
a second identification information inserting unit configured to insert, into the container, second identification information used for identifying whether the first identification information has been inserted into the container.

2. The transmitting apparatus according to claim 1,
wherein the first identification information inserting unit inserts the first identification information into a first layer of the container, and
wherein the second identification information inserting unit inserts the second identification information into a second layer that is higher than the first layer of the container.

3. The transmitting apparatus according to claim 2, wherein
the first layer is a layer of the video, and the second layer is a layer higher than the layer of the video.

4. The transmitting apparatus according to claim 3, wherein
the container is a transport stream, the first layer is one of a picture layer and a sequence layer, and the second layer is a transport layer.

5. The transmitting apparatus according to claim 4, wherein
the first identification information inserting unit inserts the first identification information into a user data area of one of the picture layer and the sequence layer of the video stream.

6. The transmitting apparatus according to claim 4, wherein
the video stream is an MPEG2 video stream.

7. The transmitting apparatus according to claim 4, wherein
the second identification information inserting unit inserts the second identification information into a descriptor placed under a video elementary loop of a program map table included in the transport stream.

8. The transmitting apparatus according to claim 4, wherein
the second identification information inserting unit inserts the second identification information into a descriptor placed under one of a service description table and an event information table included in the transport stream.

9. The transmitting apparatus according to claim 1, wherein
when the first identification information indicates that the second video stream having the three-dimensional image data inserted thereinto is included, the first identification information further includes format information regarding the three-dimensional image data.

10. The transmitting apparatus according to claim 1, further comprising:
a parallax information output unit configured to output parallax information,
wherein the three-dimensional image data is formed from left eye image data and right eye image data,
wherein the parallax information is used for adding parallax to the same superimposition information that is superimposed on an image based on the left eye image data and an image based on the right eye image data, and
wherein the transmitting unit further stores the parallax information output from the parallax information output unit in the container when the transmitting unit transmits the container including the second video stream.

11. A transmitting method comprising:
a transmitting step of transmitting a container having a predetermined format and including a first video stream having two-dimensional image data inserted thereinto and a second video stream having three-dimensional image data inserted thereinto in a time multiplexed manner;
a first identification information inserting step of inserting, into the container, first identification information used for identifying whether a video stream is the first video stream or the second video stream; and
a second identification information inserting step of inserting, into the container, second identification information used for identifying whether the first identification information has been inserted into the container.

12. A receiving apparatus comprising:
a receiving unit configured to receive a container having a predetermined format and including a first video stream having two-dimensional image data inserted thereinto and a second video stream having three-dimensional image data inserted thereinto in a time multiplexed manner, first identification information used for identifying whether a video stream is the first video stream or the second video stream, and second identification information used for identifying whether the first identification information has been inserted;
an image data acquiring unit configured to acquire image data from the container received by the receiving unit;
a first identification information acquiring unit configured to acquire the second identification information from the container received by the receiving unit;
a second identification information acquiring unit configured to acquire the first identification information from the container received by the receiving unit if the second identification information acquired by the first identification information acquiring unit indicates that the first identification information has been inserted; and
an image data processing unit configured to selectively perform one of a two-dimensional image process and a three-dimensional image process on the image data acquired by the image data acquiring unit on the basis of the first identification information acquired by the second identification information acquiring unit.

13. The receiving apparatus according to claim 12, wherein
if the second identification information acquired by the first identification information acquiring unit indicates that the first identification information has not been inserted, the image data processing unit performs the two-dimensional image process on the image data received by the receiving unit.

14. The receiving apparatus according to claim 12, further comprising:
a superimposition information data output unit configured to output data of superimposition information; and
a data superimposing unit configured to superimpose the data of superimposition information output from the superimposition information output unit on the image data output from the image data processing unit, wherein if the image data processing unit performs the three-dimensional image process and outputs left eye image data and right eye image data that constitute the three-dimensional image data, the data superimposing unit adjusts the position at which the data of superimposition information output from the superimposition information data output unit is superimposed on the basis of parallax information between a left eye image based on the left eye image data and a right eye image based on the right eye image data and superimposes the data of superimposition information having the adjusted superimposed position on each of the left eye image data and the right eye image data, and wherein if the image data processing unit performs the two-dimensional image process and outputs the two-dimensional image data, the data superimposing unit directly superimposes the data of superimposition information output from the superimposition information data output unit on the two-dimensional image data.

15. The receiving apparatus according to claim 14, further comprising:

a parallax information acquiring unit, wherein if the second video stream is included, the parallax information for adding parallax to the same superimposition information to be superimposed on the left eye image data and the right eye image data that constitute the three-dimensional image data has been inserted into the container, and the parallax information acquiring unit acquires the parallax information from the container, and wherein if the image data processing unit performs the three-dimensional image process and outputs the left eye image data and the right eye image data that constitute the three-dimensional image data, the data superimposing unit adjusts the position at which the data of superimposition information output from the superimposition information data output unit is superimposed on the basis of the parallax information acquired by the parallax information acquiring unit and superimposes the data of superimposition information having the adjusted superimposed position on each of the left eye image data and the right eye image data.

16. A receiving method comprising:

a receiving step of receiving a container having a predetermined format and including a first video stream having two-dimensional image data inserted thereinto and a second video stream having three-dimensional image data inserted thereinto in a time multiplexed manner, first identification information used for identifying whether a video stream is the first video stream or the second video stream, and second identification information used for identifying whether the first identification information has been inserted;

an image data acquiring step of acquiring image data from the container received in the receiving step;

a first identification information acquiring step of acquiring the second identification information from the container received in the receiving unit;

a second identification information acquiring step of acquiring the first identification information from the container if the second identification information acquired in the first identification information acquiring step indicates that the first identification information has been inserted; and an image data processing step of selectively performing one of a two-dimensional image process and a three-dimensional image process on the image data acquired in the image data acquiring step on the basis of the first identification information acquired in the second identification information acquiring step.

17. A transmitting apparatus comprising:

a transmitting unit configured to transmit a transport stream including a first video stream having two-dimensional image data inserted thereinto and a second video stream having three-dimensional image data inserted thereinto in a time multiplexed manner;

a first identification information inserting unit configured to insert, into a picture layer of the transport stream, first identification information used for identifying whether a video stream is the first video stream or the second video stream; and a second identification information inserting unit configured to insert, into a transport layer of the transport stream, second identification information used for identifying whether the first identification information has been inserted.

18. A transmitting method comprising:

when transmitting a transport stream including a first video stream having two-dimensional image data inserted thereinto and a second video stream having three-dimensional image data inserted thereinto in a time multiplexed manner, inserting, into a picture layer of the transport stream, first identification information used for identifying whether a video stream is the first video stream or the second video stream; and inserting, into a transport layer of the transport stream, second identification information used for identifying whether the first identification information has been inserted.

* * * * *